United States Patent [19]

Chastanet et al.

[11] Patent Number: 4,636,606

[45] Date of Patent: Jan. 13, 1987

[54] METHOD AND APPARATUS FOR PRODUCING A REACTOR SPACING GRID BY PULSE LASER WELDING

[75] Inventors: Bernard Chastanet, Boissy-sous-Saint Yon; Claude Decailloz, Palaiseau; Solange Dournel, Evry; Marcel Manson, Le Mesnil Saint-Denis, all of France

[73] Assignee: Commissariat a l'Energie Atomique, Paris, France

[21] Appl. No.: 471,317

[22] Filed: Mar. 2, 1983

[30] Foreign Application Priority Data

Mar. 3, 1982 [FR] France ............................... 82 03521

[51] Int. Cl.⁴ ............................................. B23K 26/00
[52] U.S. Cl. ..................... 219/121 LC; 219/121 LY; 219/121 EC; 219/121 PJ; 376/441; 376/462
[58] Field of Search ................. 219/121 LC, 121 LY, 219/121 LD, 121 EC, 121 ED, 121 PJ, 121 PK; 376/438, 441, 442, 462

[56] References Cited

U.S. PATENT DOCUMENTS 4,125,755 11/1978 Palmquist ........................ 219/121 L
4,224,096 9/1980 Osborne ................... 219/121 LD X
4,351,795 9/1982 Nicholson ...................... 376/438 X

FOREIGN PATENT DOCUMENTS 65315 5/1972 Luxembourg .
444335 2/1963 Switzerland .
2070998 9/1981 United Kingdom ......... 219/121 LC

OTHER PUBLICATIONS

E. D. Jones et al., *Nuclear Technology*, "The Fabrication of Grid Spacer Assemblies for Liquid-Metal Fast Breeder Reactors", vol. 52, Mar. 1981, pp. 393-400.

*Primary Examiner*—M. H. Paschall

[57] ABSTRACT

The present invention relates to a method and to an apparatus for producing nuclear reactor structures, such as spacing grids, by pulse laser welding.

The grid is placed in a tight enclosure and having thin plates, which intersect one another, so as to define a certain number of crosspieces. By means of a laser source positioned externally of the enclosure, each of the ends of the crosspieces is fixed and optionally the crosspieces are welded along the intersections of the plates.

Application to the construction of zirconium alloy spacing grids.

16 Claims, 9 Drawing Figures

METHOD AND APPARATUS FOR PRODUCING A REACTOR SPACING GRID BY PULSE LASER WELDING

BACKGROUND OF THE INVENTION

The present invention relates to a method and to an apparatus for producing nuclear reactor structural elements, such as spacing grids by pulse laser welding and more generally to the application of such a method to the production of devices incorporating small thin parts which are to be welded together.

In order to prevent lateral vibrations of fuel rods in nuclear reactors, spacing grids or mixing grids are arranged every so often along the assemblies. These grids are constituted by a system of thin plates, which intersect in pairs and thus define a certain number of racks in which are held the rods. The cooling liquid circulates between these plates and the rods and it is possible to equip the grids with so-called mixing fins, whose plane forms an angle with that of the thin plates in order to deflect the liquid streams and homogenize the cooling liquid. The mixing grids are generally very small (plate thickness approximately a few tenths of a millimeter, whilst the rack dimensions are approximately 10 to 20 mm).

At present, mixing grids are usually made from Inconel, an alloy which is easy to assemble to brazing or hard soldering, but this metal has the disadvantage of being a good neutron absorber, which causes long life activation products, such as Cobalt 60, in the primary circuit. For this reason, attention has been directed towards other alloys and in particular zirconium alloys, such as Zircaloy 4. The latter have a good resistance to corrosion by water, but are much more difficult to weld than Inconel and for this reason they have not hitherto been used for this purpose.

At first, Zircaloy is difficult to braze and this method cannot be envisaged. Moreover, as the grids are small, positioning problems are encountered on using torches and there is a danger of serious heating of the metal, which can cause deformations and oxidation of the plates.

SUMMARY OF THE INVENTION

The present invention aims at obviating these disadvantages by means of a welding method for a grid and particularly a zirconium alloy grid making it possible to eliminate any risk of deformation and oxidation.

According to the main feature of the method, the grid comprises thin plates which intersect one another and consequently define a certain number of crosspieces and the member is placed in a tight enclosure under a controlled atmosphere and the crosspieces are fixed by a welding spot made by laser at each of their ends.

At present, laser welding is a particularly well adapted method to weld zirconium alloy grids. Preference is given to the use of a pulse laser, which makes it possible to reduce the heating of the members and consequently the deformation risks.

According to another feature of the inventive method, use is made of a source emitting a laser beam positioned outside of the enclosure, the latter being provided with at least one wall which is transparent to the wavelength of the laser beam used and the arrangement is positioned in such a way that the beam traverses the wall perpendicular thereto.

In most cases, the ends of the plates are welded to belt or belting plates.

When a greater mechanical strength is required of the elements or grids to be produced, the crosspieces are welded over at least part of the intersections of the plate.

In this case, welding takes place in an alternating manner, i.e. the welds are produced in two opposite dihedral angles of each crosspiece and in these two angles only, the arrangement of the welds being such that successively along one plate there are two welds on one face, followed by two welds on the other face and so on up to the end of the plate.

Advantageously and particularly when the plates intersect at right angles, it is possible to position the laser beam in the bisecting plane of each dihedron, in such a way that it forms an angle of approximately 45° with the intersection line of the plates.

According to another feature of the method according to the invention, a light alloy rigid frame is arranged around the outer maintaining belt before fixing the crosspieces and/or welding along the intersections of the plates.

The thin plates are fixed to the belt plates by welding two tenons provided at each end of the plates into two mortises provided in the belt plates, welding taking place by means of a laser, with spots and overlap, in order to obtain a continuous weld line.

According to a variant of this method, it is possible to use mirrors in order to deflect and split the laser beam, which makes it possible to produce several welds simultaneously, and in particular, in two opposite dihedron angles of one crosspiece simultaneously.

The invention also relates to an apparatus for performing this method. According to the main feature of the apparatus, it comprises: a source emitting a pulse laser beam, a tight enclosure containing a controlled atmosphere and in which is placed the grid to be welded, said enclosure having at least one wall transparent to the wavelength of the beam used and a frame for holding or securing the grid during the welding operations.

According to a first variant, when the crosspieces are welded along the intersections ot the plate, the apparatus incorporates means making it possible to displace the frame within the enclosure. If welding is only carried out at the ends of the crosspieces, the apparatus comprises means for simultaneously moving the enclosure and the frame. In both cases, it is possible to use mirrors for deflecting and splitting the laser beam in order to produce several welds simultaneously.

Finally, the invention also relates to a zirconium alloy mixing grid obtained by the present method. This makes it possible to obtain grids on which the weld lines are free from any pollution or traces of oxidation.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
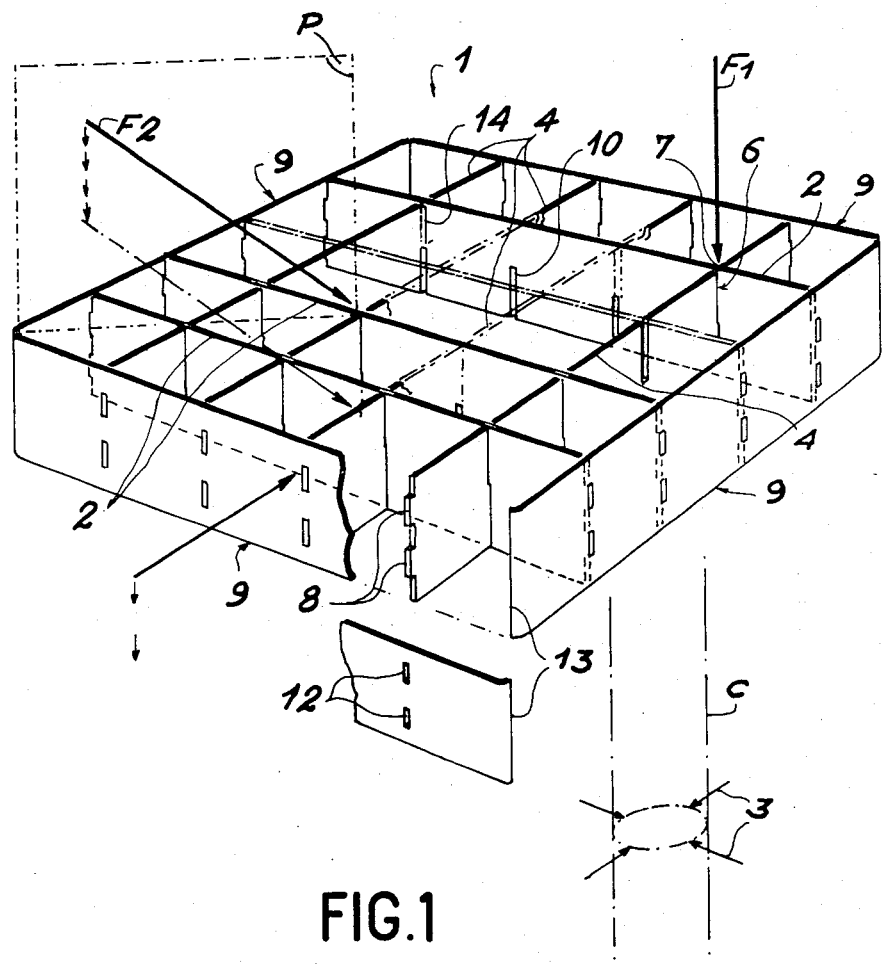
FIG. 1 a diagrammatic, perspective and partly exploded view illustrating the general principle of the method according to the invention.

FIG. 1 shows that grid 1 comprises a group of plates, such as 2 and 4, which intersect one another at right angles and define a certain number of crosspieces 6. Four plates such as 2 and four plates such as 4 are shown and these form two groups of plates which are parallel to one another and perpendicular to the plates of the other group.

The number of plates shown in the drawing has been reduced for reasons of clarity, but in actual fact there are far more such plates. Thus, for testing purposes, the method was used for producing a Zircalloy 4 grid with two groups of 16 plates having a thickness of 0.4 mm and forming racks or cells of dimensions 12.5×12.5 mm.

Each cell receives a fuel rod, like rod C, shown diagrammatically in mixed lines in FIG. 1, the latter being secured by the force exerted by four members provided within each rack (arrows 3 symbolize the action of these members). The latter are generally in the form of elastic sheets cut into plates 2 and 4. Obviously, slots such as 10 and 14 are provided along plates 2 and 4 respectively, in order that they can be fitted into one another to form crosspieces 6.

As the grid is placed under a controlled atmosphere in a tight enclosure (not shown in FIG. 1), the first stage of the method consists of fixing crosspieces 6 by a weld point at each of their ends 7, the laser beam, symbolized by arrow F1, being positioned along the intersection line of plates 2 and 4.

The second stage consists of fixing the ends of plates 2 and 4 to the so-called belt or belting plates 9. For this purpose, at the end of each plate 4 are provided two tenons 8, which are introduced into two mortises 12 in plate 9. Obviously, the latter has the same number of groups of two mortises 12, as there are plates like 4 in the grid. The welding of tenons 8 into mortises 12 takes place by means of the laser, with spots and overlap, in order to obtain a continuous weld.

The final stage consists of fixing the belt plates 9 to one another to produce the external securing belt for the grid. Plates 9 are assembled edge to edge by a weld bead 13 produced by laser, still with spots and overlap, in order once again to obtain a continuous weld.

The laser beam is located outside the enclosure in order to minimize the volume of this enclosure.

Optionally and if it is easier, it is possible to reverse the stages of the method and carry out the fixing of the crosspieces after welding plates 2 and 4 to the belt plates and after the welding together of the latter.

This leads to a grid having adequate mechanical characteristics to be used as a spacing grid in nuclear reactors. However, if an increased strength is required, it is advantageous to produce a weld of the crosspieces along the intersections of the plate, whereby said weld can be produced over the entire length of the intersection or over only part thereof. In this case, the welding of each crosspiece 6 takes place in two opposite dihedral angles and only in these two angles from among the four defined by the intersection of plates 2 and 4. Moreover, the welds are produced in an alternating manner, i.e. along each plate 2 or 4 successively two welds are produced on one face, then two welds on the other face and so on up to the end of the plate. In other words, the bisecting plane of the two dihedrons where the welds of a crosspiece are produced is perpendicular to the bisecting plane of the dihedrons, corresponding to the welds of the next crosspiece along a given plate. This makes it possible to compensate deformations due to weld shrinkage, so that a high precision assembly is obtained. The tests which were performed have shown that in the particular example described here in which the plates intersect at right angles, the best results are obtained by disposing the laser beam, symbolized by arrow F2, in the bisecting plane P of one of the four dihedrons formed by two plates 2 and 4 and in such a way that it forms an angle of 45° with the intersection line of plates 2 and 4. Here again, welding takes place by spots with an overlap, in order to provide a continuous weld line. It is very important to make a symmetrical weld in order that the deformations compensate one another. This is obtained not only by placing the laser beams in the bisecting plane of each dihedron, but also by producing the weld in two opposite dihedral angles in order to produce deformations in opposite directions, which cancel one another out. With regards to the angle between the direction of the beam and the intersection line of the plates, its ideal value is 45° in the presently described example, where the plates define square racks of side length 12.5 mm welded on a 6 mm height, but this value can easily be modified as a function of the grid dimensions. However, the best results are obtained with an angle of 45° and whenever possible this value should be used. The grid 1 is mounted on a moving support, so that it can be moved to successively carry out the welds on all the crosspieces 6. When all the welds are completed, the light alloy holding frame is removed.

In the case where the grids are made from zirconium alloy, which is one of the main objectives of the invention, it is advantageous to place them in an enclosure under a neutral gas and provided with a porthole or window permitting the passage of the laser beam, in order to prevent any oxidation at the welds. In most cases, a pulse laser is used. Thus, the beam energy is transmitted in a discontinuous manner, which limits the heating of the members and permits a precise weld, whilst considerably reducing the deformation and oxidation risks.

Figure 2:
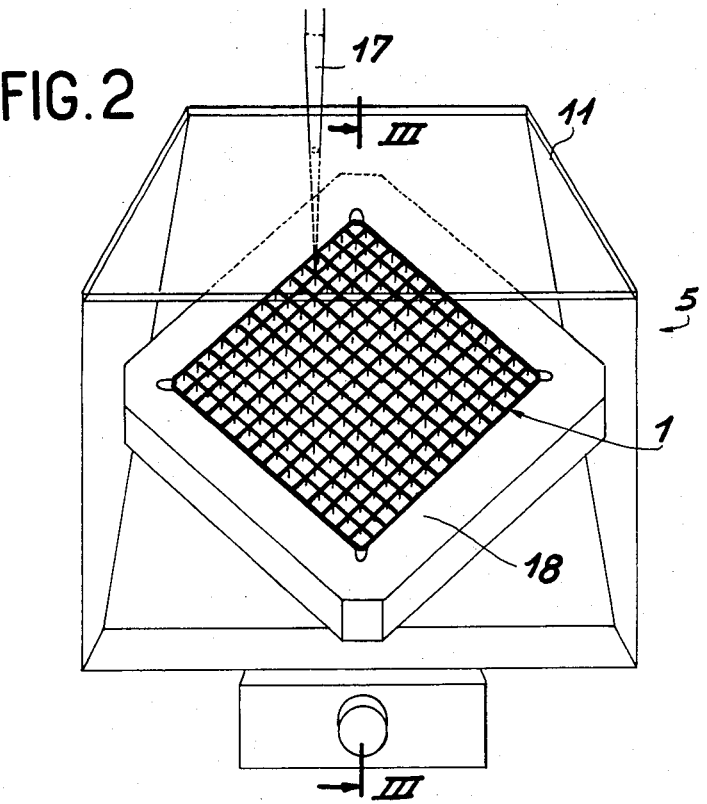
FIG. 2 a diagrammatic view showing the grid to ge welded, placed in an enclosure containing a neutral gas, in the case where the crosspieces are welded along the intersections of the plates.

An example of sequential welding is illustrated by FIGS. 2 to 5. In FIG. 2, the grid 1 is placed in an enclosure 5, filled with argon, whose upper wall is a glass porthole or window 11 permitting the passage of laser beam 17. Grid 1 is surrounded by a light alloy frame 18. The overall arrangement is such that the laser beam always passes through the transparent wall 11 perpendicular to the latter, which obviates refraction errors in the aiming of the spots to be welded. The term "transparent" used above means that wall 11 permits the passage of the wavelength of the beam used and the term is used in this sense throughout the remainder of the text. Moreover, it is advantageous to use a wall which has been given an anti-reflection treatment, in order to reduce energy losses when it is traversed by the beam.

Figure 3:
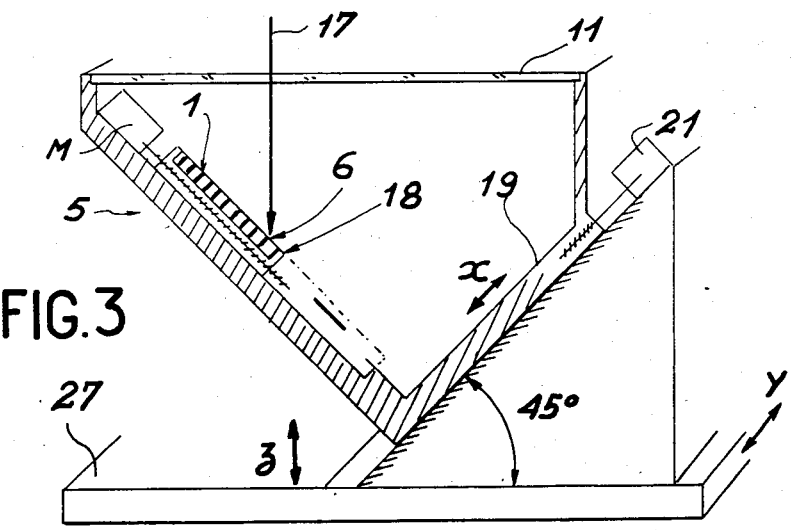
FIG. 3 a diagrammatic sectional view along line III—III of FIG. 2.

The sectional view of FIG. 3 shows that enclosure 5 is placed on a support 19, inclined by 45° relative to the horizontal and displaceable in this direction by means of a screw 21 (direction x). This movement makes it possible at the end of beam 17 (fixed and vertical thereto) to pass through the entire length of crosspiece 6, whilst constantly forming an angle of 45° with the intersection line of the plates. The arrangement is placed on a table 27 permitting vertical displacements (direction z) or horizontal displacements (direction y perpendicular to the plane of the drawing) in order to successively bring all the crosspieces beneath beam 17. In certain cases, it may be advantageous to provide within enclosure 5, a device for making it possible to displace grid 1 in a direction perpendicular to direction x.

Figure 4:
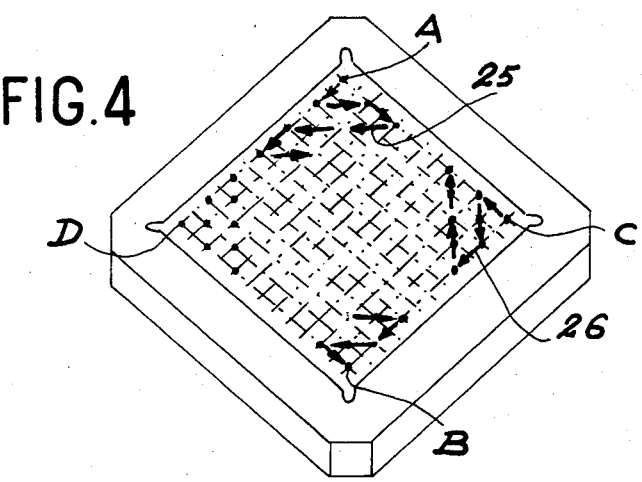
FIG. 4 a diagrammatic perspective view illustrating the grid welding sequence represented in FIG. 2.

FIG. 4 illustrates the welding sequence. The grid is positioned in such a way that crosspiece A is located beneath the beam and welding takes place in one of the dihedral angles of this crosspiece. The grid is then moved in such a way that the beam follows the path symbolized by line 25, whilst the weld of formed in one of the angles of each crosspiece and so on up to crosspiece B, whilst optionally jumping certain crosspieces in order to arrive at the final desired arrangement. The grid is then turned by a quarter of a turn, so that crosspiece C takes the place of crosspiece B and another series of welds is produced along line 26 up to point D. The grid is then turned over and the same thing takes place on the other face.

Figure 5:
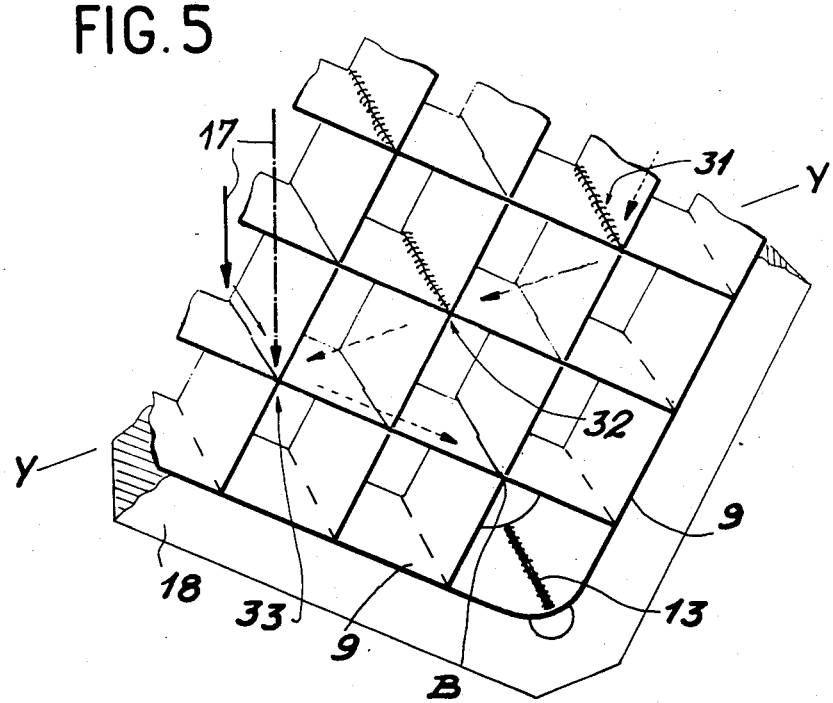
FIG. 5 a larger-scale view of the lower part of the grid of FIG. 4.

FIG. 5 illustrates the last part of the welding sequence corresponding to line 25, on arriving in the vicinity of the crosspiece B. Welding takes place in one of the dihedral angles of crosspiece 33, after doing the same thing on crosspieces 31 and 32. One then arrives at crosspiece B. The other welds are produced during the following sequences after rotating or turning over the grid. Obviously, this is only an example and other sequences are possible, as a function of the particular case.

Figure 6:
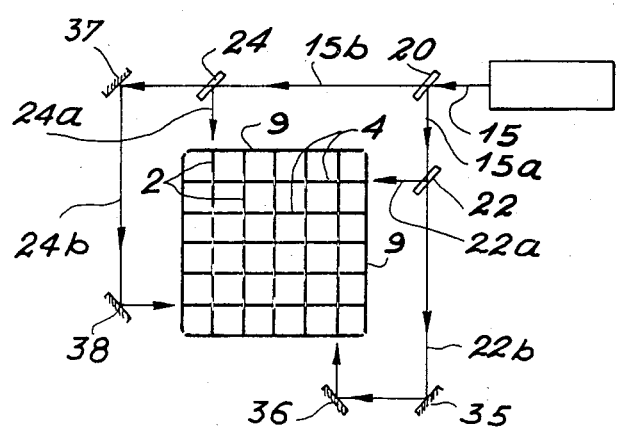
FIG. 6 a diagrammatic view showing how it is possible to split the laser beam with the aid of mirrors in order to simultaneously weld several plates to belt plates.
Figure 7:
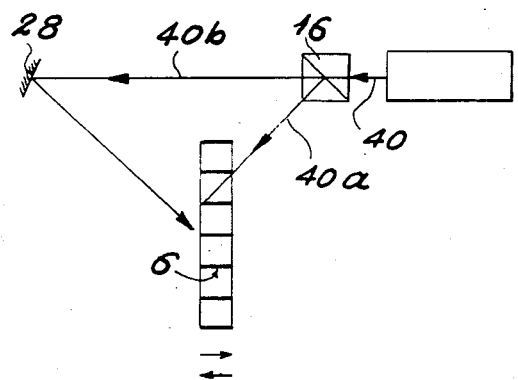
FIG. 7 a diagrammatic view showing how it is possible to split the laser beam by mirrors, in order to weld several crosspieces simultaneously.

FIGS. 6 and 7 illustrate an improvement to this method making it possible to produce several welds simultaneously by splitting and deflecting the laser beam.

In FIG. 6, it can be seen that beam 15 strikes a first semi-reflecting mirror 20 inclined by 45°, which reflects part of the energy of beam 5 and giving a beam 15a perpendicular to the latter, whilst transmitting a second beam 15b. Beam 15a strikes another semi-reflecting mirror 22, which has the same effect as mirror 20. Beam 15a is then split into a reflected beam 22a and a transmitted beam 22b, which two total reflection mirrors 35, 36 reflect to the intersection of a plate 2 with a belt plate. In the same way, mirror 24 splits beam 15b into a reflected beam 24a and a transmitted beam 24b, which are reflected by total reflection mirrors 37, 38 to another intersection of a plate 4 with a belt plate. The arrangement of the mirrors is such that the ends of the beams 22a, 22b, 24a, 24b are each on one face of the grid and are arranged symmetrically, e.g. facing the first intersection of the belt plates with plates 2 and 4, as illustrated in FIG. 6. Thus, with a single laser beam, it is possible to produce four welds simultaneously and carry out symmetrical welding, in order to limit deformation to the maximum. By displacing the grid, all the end welds are produced successively.

FIG. 7 shows how it is possible to produce the welding of crosspieces 6 from two faces of the grid after pivoting the latter in such a way that it presents its edge. Beam 40 firstly passes through a refraction device 16, which splits it up into a refracted beam 40a, which strikes against the face of the grid and a transmitted beam 40b. The latter is reflected onto the other face of the grid by a total reflection mirror 28. The overall arrangement is such that beams 40a and 40b form an angle of 45° with the intersection lines of plates 2 and 4. It is thus possible to weld two crosspieces simultaneously or the two halves of the same crosspiece, each with one of the two beams. This also makes it possible to produce a symmetrical weld in order to reduce the deformations, by carrying out welding simultaneously in two opposite dihedral angles of the same crosspiece.

It is obviously possible to choose the number and arrangement of the mirrors in such a was as to simultaneously produce the largest possible number of welds, whilst bearing in mind the overall dimensions of the apparatus and the energy losses, whenever a beam splits on contact with a mirror.

The tests which have been performed have made it possible to obtain Zircaloy 4 grids having no deformations and where the weld beads were free from any pollution or oxidation. These tests were carried out with a laser of wavelength of 1.06 $\mu$m doped with neodymium and with relaxed pulses.

Figure 8:
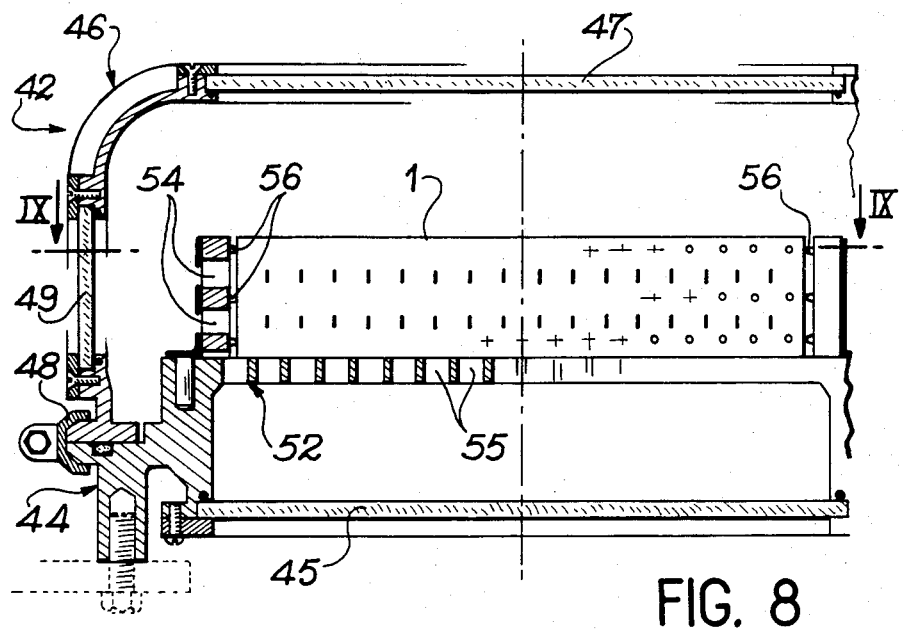
FIG. 8 a diagrammatic vertical sectional view of a tight enclosure in the case where the crosspieces are only welded at their ends.
Figure 9:
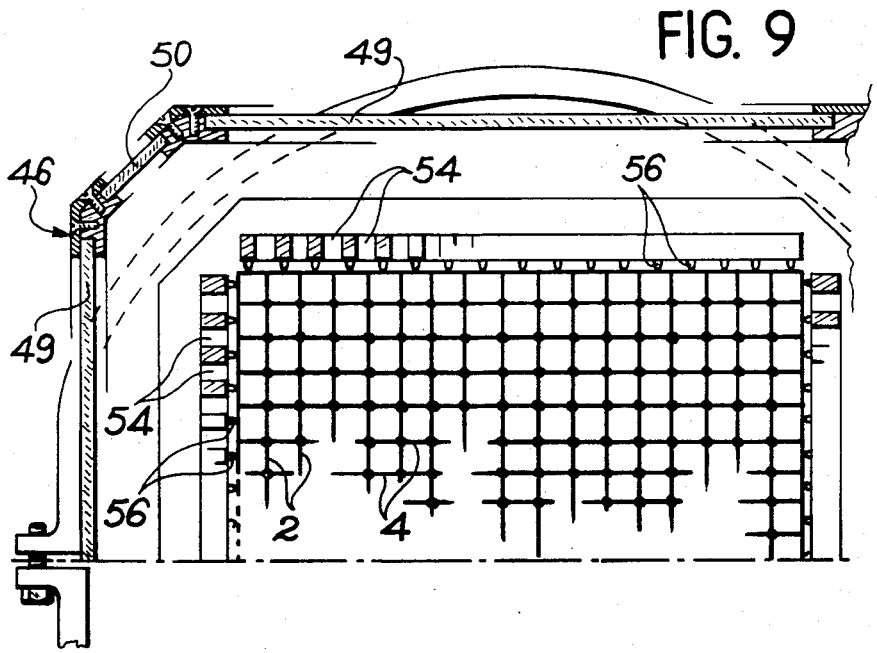
FIG. 9 a part sectional plan view along line IX—IX of FIG. 8.

FIGS. 8 and 9 illustrate a particular construction of the tight enclosure in the case in which only the ends of each crosspiece are welded. FIG. 8 shows that the enclosure 42 comprises a base 44, connected to an upper box 46 by a binding or hooping device 48. Base 46 is equipped with a glass plate or transparent wall 45, whilst the box 46 has an upper glass plate 47 and lateral glass plates 49. It can be seen in FIG. 9 that box 46 has an octogonal shape with small transparent walls 50 at 45° from walls 49. Walls 45 and 47 permit the welding of the ends of the crosspieces, walls 49 the welding of plates 2 and 4 to belt plates 9 and walls 50 the welding of the end plates to one another, the laser beam still being perpendicular to the wall which it transverses.

It is also possible to see a holding frame 52, integral with base 44 and which surrounds the grid to be welded, on its lower face and its lateral faces. Openings 54 in the lateral parts of frame 52 permit the passage of the beam in order to weld plates 2 and 4 to the belt plates, whilst the openings 55 in the lower part of the frame make it possible to weld the lower ends of the crosspieces. Holding is ensured by pins 56, which bear against the belt plates between the intersection areas of the latter with plates 2 and 4.

In this case, it is the assembly constituted by enclosure 42, frame 52 and grid 1 which moves in front of the laser beam. In all cases where it is merely necessary to weld each end of the crosspieces, it is advantageous to use an enclosure like that shown in FIGS. 8 and 9. This is because of its small size, so that it is easier to control the atmosphere prevailing therein, the assembly constituted by the grid and the enclosure can easily be manipulated and it is possible to install the grid in the enclosure without immobilizing the welding station. The fact that several enclosures are used make it possible to improve production rates without significantly increasing installation costs, because the costs of the enclosures are moderate due to their small size.

Obviously, the embodiment described hereinbefore is not limitative and various modifications can be made with regards to the constructional details of the enclosure.

Thus, the method according to the invention has particularly interesting advantages, because it makes it possible to produce in an accurate manner and without any risk of deformation zirconium alloy nuclear reactor mixing grids. Moreover, the fact that the laser beam is split in order to produce several weld spots or beads simultaneously, increases the profitability of the procedure and helps to limit deformations whilst permitting the production of a symmetrical weld. Finally, it is possible to automate the method through the possibility of splitting the beam and due to the mechanical accuracy of the grids, which facilitates their positioning. In the case when it is merely necessary to weld each end of the crosspieces, the profitability of the method can be further improved by using enclosures like those illustrated in FIGS. 8 and 9. The applications are not limited to mixing grids for nuclear reactors, because this method can also be used for producing any other device in which thin, small parts have to be welded.

Finally, it is obvious that the invention is not limited to the embodiments described hereinbefore and numerous variants are possible thereto without passing beyond the scope of the invention, particularly with regards to the order in which the various welds are produced and with regards to the construction of the tight enclosures.

What is claimed is:

1. A method for producing by pulse laser welding a structural component of a nuclear reactor, welding being carried out by means of a laser source emitting a pulse laser beam having a given wavelength, said component comprising at least a first plate provided with at least one slot into which a second plate is inserted, thus defining an intersection line of the plates and forming a crosspiece, said crosspiece having two ends and defining four dihedral angles, each of said plates having two ends, said method comprising:
   securing said component inside a tight enclosure under a controlled atmosphere, said enclosure having at least one wall which is transparent to said wavelength, said laser source being placed outside said enclosure, and said enclosure being movable with respect to said laser source
   placing said enclosure so that said laser beam traverses said transparent wall perpendicular thereto before impinging on said component, and
   fixing said cross-piece by a single weld spot made at each of its ends.

2. A method as in claim 1 wherein welding of said crosspiece is also carried out over at least part of the intersection line of said plates.

3. A method as in claim 2 wherein the laser beam is positioned in the bi-secting plane of one of said four dihedral angles and forms an angle of approximately 45° with the intersection line of the plates.

4. A method as in claim 2 wherein welding of said crosspiece is carried out in two opposite dihedral angles of said four dihedral angles.

5. A method as in claim 4 wherein, said first plate having two faces and being provided with a plurality of slots into which several second plates are inserted, along said first plate are successively produced two welds on one face followed by two welds on the other face of said first plate, and so on up to one of said ends of said first plate.

6. A method as in claim 1 wherein at least one end of one of said plates is fixed by welding to a belting plate.

7. A method as in claim 6 wherein said plate has two tenons at said end and is fixed to said belting plate by welding said two tenons into two mortises provided in said belting plate.

8. A method as in claim 7 wherein, said structural component comprising a plurality of belting plates, the belting plates are assembled to one another to produce an external securing belt for said structural component.

9. A method as in claim 8 or claim 2 wherein a rigid light alloy frame is arranged around said external securing belt prior to carrying out welding of the crosspieces along the intersection line of said plates.

10. A method as in claim 1 wherein a plurality of movable mirrors are used for deflecting and splitting the laser beam, which makes it possible to produce several welds simultaneously.

11. A zirconium alloy nuclear reactor mixing grid obtained by the method according to claim 1.

12. An apparatus for producing by pulse laser welding a structural component of a nuclear reactor, said apparatus comprising:
   a laser source emitting a pulse laser beam having a given wavelength,
   a tight enclosure containing a controlled atmosphere and having at least one wall which is transparent to said wavelength, said laser source being placed outside said enclosure,
   a frame, disposed inside said enclosure, and in which said structural component is secured during welding operations,
   means for guiding the laser beam so that it traverses said transparent wall perpendicular thereto before impinging on said structural component, and
   means for displacing said enclosure with respect to said laser beam, said means for displacing said enclosure with respect to said laser beam comprising:
   a table having an upper planar horizontal face, said table being movable along one vertical direction and one horizontal direction,
   a support placed on said table and having at least one face which is inclined by 45° relative to said horizontal face, said enclosure resting on said inclined face and said transparent wall being horizontal when said enclosure rests on said inclined face, and
   means for displacing said enclosure along said inclined face in a direction perpendicular to said horizontal direction.

13. An apparatus as in claim 12 further comprising means for displacing said frame within said enclosure.

14. An apparatus as in claim 12 comprising means for securing said frame with respect to said enclosure.

15. An apparatus for producing by pulse laser welding a structural component of a nuclear reactor, said apparatus comprising:
   a laser source emitting a pulse laser beam having a given wavelength,
   a tight enclosure containing a controlled atmosphere and having at least one wall which is transparent to said wavelength, said laser source bring placed outside said enclosure,
   said enclosure comprising:
   at least one upper planar wall transparent to said wavelength, at least one lower planar wall transparent to said wavelength, at least one lateral wall transparent to said wavelength and arranged perpendicular to said upper and lower walls, at least one wall transparent to said wavelength arranged perpendicular to said upper and lower walls and at 45° from said lateral wall, and a frame in which said structural component is secured during welding operations, said frame comprising a plurality of openings to permit the passage of said laser beam, means for guiding the laser beam so that it traverses said transparent wall perpendicular thereto before impinging on said structural component, and means for displacing said enclosure with respect to said laser beam.

16. An apparatus as in claim 15 comprising a plurality of mirrors movable with respect to said enclosure, said mirrors making it poosible to split and deflect the laser beam in order to simultaneously produce several welds.

* * * * *